Patented June 25, 1946

2,402,676

UNITED STATES PATENT OFFICE 2,402,676

DRYING NAVY BEANS

Robert M. Schaffner, Chicago, Ill., assignor to The Guardite Corporation, a corporation of Illinois No Drawing. Application June 19, 1944,
Serial No. 541,123

5 Claims. (Cl. 99—204)

This invention relates to the dehydration of navy beans, and more particularly to the vacuum dehydration of precooked navy beans.

Beans produced by the present process have a more uniform appearance, have a superior flavor, color and texture after cooking and baking, and fewer split beans are produced during the drying. The final product can be reconstituted to a form satisfactory for eating after baking 15 to 45 minutes, and no long soaking period is required before the baking, as distinguished from the usual dried navy bean.

The thorough precooking of the beans before dehydration has been found to be a most important step in the process. This cooking may be carried out by first soaking the beans from 1 to 6 hours in water, cooking them at a temperature above 212° F., and then drying them in a vacuum dryer.

The following cooking process was found preferable: The beans are soaked in water for 45 minutes at 70° F. whereupon the temperature is raised to 180° F. and the beans are soaked at that temperature for 45 minutes more. Thereafter they are drained and placed in a pressure retort. Thorough cooking requires a considerable time at temperatures above 212° F. This varies inversely with the temperature, the time being usually from 1 to 3 hours. A satisfactory cooking process is to heat the beans for 90 minutes at 244° F., followed by cooking at a gradually diminishing temperature to 212° F., the time of the reduction from 244° to 212° being about 15 minutes.

The beans at this stage are thoroughly cooked but it has been found that occasionally there are some minor portions thereof which are not completely cooked due to poor heat transfer or other reasons. It is, therefore, preferred to provide an additional cooking step under vacuum. For this purpose the beans are loaded on screen-bottom trays at loading densities of 1 to 1.3 lbs. per square foot of tray surface. The trays are then placed in a vacuum chamber in which the pressure is reduced to remove substantially all air. For ordinary purposes a reduction in pressure to ½ inch absolute is satisfactory. The beans are then given a second cooking treatment by admitting saturated steam to the chamber to raise the temperature to 200–219° F., corresponding to pressures of 23 inches of mercury absolute up to 2 lbs. per square inch of steam pressure gauge. The time employed varies inversely with the temperature. A cook of 2 minutes at 219° F. is satisfactory. At 200° F. it is preferred to cook for 10 minutes.

The chamber is then evacuated again to about ½ inch absolute and the trays transferred under vacuum to a drying chamber wherein they are maintained in an atmosphere of superheated steam while exposed at close range to intense radiant energy. A suitable drying system is described in Heineman application, Serial 520,773, filed February 2, 1944, and Baer application, Serial No. 524,177, filed February 28, 1944. In this apparatus the trays are passed in superposed layers through a long drying chamber into which superheated steam is introduced at the beginning and end, and withdrawn at the middle. The pressure is maintained therein at approximately 2¼ inches of mercury absolute. The trays are each surrounded by coils which are heated internally by high pressure steam. The coils are arranged in progressive banks which may be maintained at different temperature levels at different stages in the chamber. These coils are maintained with their outer surfaces approximately 3 inches from the material to be dried.

These surfaces are preferably maintained between 316° F. and 200° F. In all cases the coil temperature nearer the entrance of the vacuum chamber is higher than at the exit end thereof. The time required will vary with the heat input but in general ranges from 60 to 180 minutes. A highly satisfactory drying cycle for tray loading densities from 1.2 to 1.6 lbs. per square foot is as follows:

| Radiant heat surface temperature | Minutes |
| --- | --- |
| 293° F | 36 |
| 259° F | 36 |
| 240° F | 18 |
| 228° F | 36 |
| 219° F | 36 |

The resulting moisture contents of the final products range from 1.6 to 2.4%. This range of final product is not, however, critical.

It is preferred, when using a chamber having superposed layers of trays, to employ a higher loading density on the top tier. It has been found that an increase in density of 0.2 lbs. per square foot prevents overdrying in the top trays.

The foregoing detailed description has been given for clearness of understanding only, and no unnecessary limitations should be understood therefrom.

What I claim as new, and desire to secure by Letters Patent, is:

1. The method of drying navy beans which comprises thoroughly cooking the beans, removing air therefrom, again cooking the beans by subjecting the beans to an atmosphere of substantially saturated steam at a temperature of at least 200° F. for a short time, reducing the pressure, and then introducing the product to a drying zone maintained at low absolute pressure of approximately 2¼ inches of mercury absolute in an atmosphere of superheated steam and while subjected to intense radiant energy from radiant surfaces surrounding the beans and having, for a surface approximately 3 inches from the beans, a temperature of 293° F. for 36 minutes, 259° F. for 36 minutes, 240° F. for 18 minutes, 228° F. for 36 minutes, and 219° F. for 36 minutes, said beans being loaded on screens at densities of approximately 1.2 to 1.6 pounds per square foot.

2. The method of drying navy beans which comprises thoroughly soaking the beans in water, cooking the beans for approximately 90 minutes at approximately 244° F., cooking for approximately 15 minutes longer during which the temperature is gradually decreased to approximately 212° F., removing air from the cooked beans, and drying the beans in an atmosphere of superheated steam while subjecting them to intense radiant energy.

3. The method of drying navy beans which comprises thoroughly cooking the beans at temperatures above 212° F. for 1 to 3 hours, removing air from the beans, again cooking the beans in an atmosphere of substantially saturated steam at a temperature of 200–219° F. for a period of 10 to 2 minutes, and drying the beans out of substantial contact with air in an atmosphere of superheated steam while subjecting them to intense radiant energy.

4. The method of drying navy beans which comprises thoroughly cooking the beans at temperatures above 212° F. for 1 to 3 hours, removing substantially all air from the beans, again cooking the beans in an atmosphere of substantially saturated steam at a temperature of 200–219° F. for a period of 10 to 2 minutes, subjecting the beans to a high vacuum and transferring them while under vacuum to an atmosphere of superheated steam under a slightly higher pressure and drying under intense radiant energy while subjected to said superheated steam.

5. The method of drying navy beans which comprises thoroughly cooking the beans at temperatures above 212° F. for 1 to 3 hours, removing air therefrom, and drying the beans in an atmosphere of superheated steam while subjected to intense radiant energy from radiant heat surfaces maintained at 316° F. to 200° F. for surfaces approximately 3 inches from the product being dried, the drying being continued until the product has reached a moisture content of approximately 1.6 to 2.4%, said beans being loaded on screens at densities of 1.2 to 1.6 lbs. per square foot during the drying operation.

ROBERT M. SCHAFFNER.